United States Patent
Rodeheffer

(10) Patent No.: US 11,226,255 B2
(45) Date of Patent: Jan. 18, 2022

(54) PROCESS TRANSMITTER ISOLATION UNIT COMPENSATION

(71) Applicant: Rosemount Inc., Shakopee, MN (US)

(72) Inventor: John Edward Rodeheffer, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 974 days.

(21) Appl. No.: 15/279,609

(22) Filed: Sep. 29, 2016

(65) Prior Publication Data

US 2018/0087987 A1    Mar. 29, 2018

(51) Int. Cl.
| | |
|---|---|
| *G01L 19/04* | (2006.01) |
| *G01L 19/00* | (2006.01) |
| *G01L 13/02* | (2006.01) |
| *G01L 9/00* | (2006.01) |
| *G01L 19/14* | (2006.01) |

(52) U.S. Cl.
CPC ............ *G01L 19/04* (2013.01); *G01L 9/0041* (2013.01); *G01L 13/025* (2013.01); *G01L 19/0046* (2013.01); *G01L 19/0092* (2013.01); *G01L 19/143* (2013.01)

(58) Field of Classification Search
CPC ..... G01L 19/04; G01L 9/0041; G01L 13/025; G01L 19/0046; G01L 19/0092
USPC .......................................................... 73/708
See application file for complete search history.

(56) References Cited

U.S. PATENT DOCUMENTS

| | | |
|---|---|---|
| 3,276,437 A | 10/1966 | Jonakin et al. |
| 3,533,273 A | 10/1970 | Green |
| 3,724,267 A | 4/1973 | Zoschak |
| 4,096,575 A * | 6/1978 | Itoh ...................... G01D 3/0365 250/252.1 |
| 4,186,605 A | 2/1980 | Bourigault |
| 4,355,908 A | 10/1982 | Weisser et al. |

(Continued)

FOREIGN PATENT DOCUMENTS

| | | |
|---|---|---|
| CN | 201589672 | 9/2010 |
| CN | 103512630 | 1/2014 |

(Continued)

OTHER PUBLICATIONS

Notification of Transmittal of the International Search Report and the Written Opinion of the International Searching Authority from International Patent Application No. PCT/US2017/039202, dated Sep. 11, 2017, 14 pages.

(Continued)

*Primary Examiner* — Nimeshkumar D Patel
*Assistant Examiner* — Jean F Morello
(74) *Attorney, Agent, or Firm* — Westman, Champlin & Koehler, P.A.

(57) ABSTRACT

A process transmitter includes an isolation unit, a process sensor, a compensation circuit, and an output circuit. The isolation unit is configured to engage a process and includes a medium. The process sensor is configured to produce a process signal that is a function of a parameter of the process that is communicated through the medium. The compensation circuit is configured to compensate the process signal for a response time of the isolation unit, and output a compensated process signal. The output circuit is configured to produce a transmitter output as a function of the compensated process signal.

14 Claims, 9 Drawing Sheets

(56) References Cited

U.S. PATENT DOCUMENTS

| | | |
|---|---|---|
| 4,384,793 A | 5/1983 | O'Brien |
| 4,396,300 A | 8/1983 | Characklis et al. |
| 4,415,279 A | 11/1983 | Beuse et al. |
| 4,436,438 A | 3/1984 | Voznick |
| 4,488,516 A | 12/1984 | Bueters et al. |
| 4,527,908 A | 7/1985 | Arisi |
| 4,722,609 A | 2/1988 | Epstein et al. |
| 4,722,610 A | 2/1988 | Levert et al. |
| 4,826,540 A | 5/1989 | Mele |
| 4,968,151 A | 11/1990 | Thomson |
| 5,064,604 A | 11/1991 | Barton |
| 5,233,868 A | 6/1993 | Coats et al. |
| 5,495,769 A | 3/1996 | Broden et al. |
| 5,743,646 A | 4/1998 | O'Connell et al. |
| 5,920,617 A * | 7/1999 | Berger ............... G01K 7/42 |
| | | 123/406.55 |
| 5,980,102 A | 11/1999 | Stulen et al. |
| 6,295,875 B1 * | 10/2001 | Frick ............... G01L 9/0072 |
| | | 73/718 |
| 6,367,970 B1 | 4/2002 | Danielson |
| 6,473,710 B1 | 10/2002 | Eryurek |
| 6,485,174 B1 | 11/2002 | Albrecht et al. |
| 6,503,221 B1 | 1/2003 | Briggs et al. |
| 6,662,662 B1 * | 12/2003 | Nord ............... G01L 19/0618 |
| | | 73/715 |
| 6,681,625 B1 | 1/2004 | Berkcan et al. |
| 6,725,731 B2 * | 4/2004 | Wiklund ........... F15B 15/2838 |
| | | 73/861.52 |
| 6,824,305 B1 | 11/2004 | Boyd et al. |
| 6,848,373 B2 | 2/2005 | Breen et al. |
| 6,883,369 B1 | 4/2005 | Myhre |
| 6,983,586 B2 | 1/2006 | Tangirala et al. |
| 7,036,381 B2 * | 5/2006 | Broden ............ G01L 19/0645 |
| | | 73/708 |
| 7,220,050 B2 | 5/2007 | Esprimont et al. |
| 7,249,883 B2 | 7/2007 | Kuroda et al. |
| 7,249,885 B2 | 7/2007 | Van Den Ende et al. |
| 7,258,021 B2 * | 8/2007 | Broden ............. G01L 13/025 |
| | | 73/716 |
| 7,395,173 B2 | 7/2008 | Kautz et al. |
| 7,447,607 B2 | 11/2008 | Schuh et al. |
| 7,624,632 B1 | 12/2009 | Hoyle et al. |
| 7,789,554 B2 | 9/2010 | Sattler et al. |
| 8,033,175 B2 | 10/2011 | Sundet et al. |
| 8,057,093 B2 | 11/2011 | Sattler |
| 8,092,085 B2 | 1/2012 | Kawase et al. |
| 8,280,674 B2 | 10/2012 | Schwerer et al. |
| 8,301,408 B2 | 10/2012 | Howe |
| 8,591,102 B2 | 11/2013 | Frach et al. |
| 8,596,113 B2 | 12/2013 | Matsumoto et al. |
| 8,671,890 B2 | 3/2014 | Davidson |
| 8,851,745 B2 | 10/2014 | Sakami |
| 8,924,190 B2 | 12/2014 | Djelassi |
| 9,157,763 B2 | 10/2015 | Schulte et al. |
| 9,188,490 B2 | 11/2015 | Perrault et al. |
| 9,588,003 B2 | 3/2017 | Hedtke et al. |
| 9,970,828 B2 | 5/2018 | Ude |
| 10,234,338 B2 | 3/2019 | Rieder et al. |
| 2004/0079341 A1 * | 4/2004 | Fuwa ............... F02D 41/18 |
| | | 123/488 |
| 2004/0163969 A1 | 8/2004 | Breen et al. |
| 2005/0114068 A1 | 5/2005 | Chey et al. |
| 2005/0209813 A1 | 9/2005 | Kautz et al. |
| 2005/0217841 A1 | 10/2005 | Van Den Ende et al. |
| 2006/0050767 A1 | 3/2006 | Fleming |
| 2008/0053242 A1 * | 3/2008 | Schumacher ........... G01F 1/363 |
| | | 73/861.42 |
| 2008/0083446 A1 | 4/2008 | Chakraborty et al. |
| 2009/0110023 A1 | 4/2009 | Clark, Jr. et al. |
| 2009/0196374 A1 | 8/2009 | Schulte et al. |
| 2009/0293625 A1 | 12/2009 | Sundet et al. |
| 2010/0064816 A1 * | 3/2010 | Filippi ............ G01L 19/0645 |
| | | 73/715 |
| 2010/0111133 A1 | 5/2010 | Yahas et al. |
| 2010/0246630 A1 | 9/2010 | Kaszynski et al. |
| 2010/0257871 A1 | 10/2010 | Venkatasubramanian et al. |
| 2010/0316086 A1 | 12/2010 | Engelstad et al. |
| 2011/0054822 A1 | 3/2011 | Bauschke et al. |
| 2011/0119018 A1 | 5/2011 | Skarp |
| 2011/0238351 A1 | 9/2011 | Djelassi |
| 2012/0067542 A1 | 3/2012 | Frach et al. |
| 2012/0109572 A1 | 5/2012 | Shimizu |
| 2012/0128024 A1 | 5/2012 | Tsuchida et al. |
| 2013/0325381 A1 | 12/2013 | Varnak et al. |
| 2013/0333440 A1 | 12/2013 | Hedtke |
| 2014/0161151 A1 | 6/2014 | Proctor et al. |
| 2014/0348205 A1 | 11/2014 | Shaw et al. |
| 2015/0082892 A1 | 3/2015 | Hedtke et al. |
| 2015/0185085 A1 | 7/2015 | Converse |
| 2016/0091383 A1 * | 3/2016 | Hoffman ............ G01L 19/0046 |
| | | 73/706 |
| 2016/0178446 A1 * | 6/2016 | Ude ................. G01K 7/42 |
| | | 374/107 |
| 2017/0074730 A1 | 3/2017 | Rieder et al. |
| 2017/0184456 A1 | 6/2017 | Chatterjee |
| 2017/0212065 A1 | 7/2017 | Rud et al. |
| 2017/0269015 A1 | 9/2017 | Günther et al. |
| 2018/0087987 A1 | 3/2018 | Rodeheffer |
| 2018/0128668 A1 | 5/2018 | Newell et al. |
| 2018/0238741 A1 | 8/2018 | Rud et al. |

FOREIGN PATENT DOCUMENTS

| | | |
|---|---|---|
| CN | 104062034 | 9/2014 |
| CN | 104515643 | 4/2015 |
| CN | 105043570 | 11/2015 |
| CN | 105716733 | 6/2016 |
| CN | 105784149 | 7/2016 |
| DE | 3803104 | 8/1989 |
| DE | 199 39 757 | 2/2001 |
| DE | 10 2007 055029 | 8/2009 |
| DE | 102007055029 | 8/2009 |
| EP | 0908712 | 4/1999 |
| FR | 2724727 | 3/1996 |
| GB | 2 500 034 | 9/2013 |
| JP | 2004-279311 | 10/2004 |
| JP | 2004-357426 | 12/2004 |
| JP | 2005-171984 | 6/2005 |
| JP | 2006-249715 | 9/2006 |
| JP | 2011-027619 | 2/2011 |
| JP | 2011-511382 | 4/2011 |
| RU | 98240 | 10/2010 |
| RU | 2453931 | 6/2012 |
| RU | 2466365 | 11/2012 |
| UA | 37415 | 11/2008 |
| WO | WO 91/14161 | 9/1991 |
| WO | 0184101 A2 | 11/2001 |
| WO | 2009154586 | 12/2009 |
| WO | 2010067009 | 6/2010 |
| WO | WO 2013/132239 | 9/2013 |
| WO | WO 2014/037257 | 3/2014 |
| WO | WO 2014/052140 | 4/2014 |
| WO | WO 2015/135739 | 9/2015 |

OTHER PUBLICATIONS

Non-Final Rejection for U.S. Appl. No. 15/437,731, dated Aug. 16, 2018, 16 pages.
Notification of Transmittal of the International Search Report and the Written Opinion of the International Searching Authority from PCT/US2018/017937, dated Apr. 17, 2018, 14 pages.
Office Action from U.S. Appl. No. 15/437,731, dated Feb. 26, 2019.
Rosemount 644 Temperature Transmitter Reference Manual 00809-0200-4728 (Year: 2012).
Rosemount 644 Temperature Transmitter Product Data Sheet 00809-0200-4728 (Year: 2010).
Prosecution History from U.S. Appl. No. 15/081,497 including: Non-Final Rejection dated Mar. 4, 2019 and Non-Final Rejection dated Aug. 9, 2016.
International Search Report and Written Opinion of PCT/RU2016/000020, dated Oct. 27, 2016.

(56) References Cited

OTHER PUBLICATIONS

Product Sheet 00813-0100-4952, Rev BA, Rosemount Pipe Clamp RTD Sensor, Emerson Process Management, Dec. 2010.
International Search Report and Written Opinion of PCT/US2014/067243, dated Feb. 27, 2015, 10 pages.
First Office Action dated Nov. 27, 2018, for Chinese Patent Application No. 201680000355.8, 17 pages including English translation.
Office Action from Chinese Patent Application No. 201710387443.4, dated Jun. 20, 2019.
Communication from European Patent Application No. 17735348.9, dated Mar. 20, 2019.
Office Action from Chinese Patent Application No. 201611159645.5, dated Jul. 19, 2019.
Examination Report from Australian Patent Application No. 2017337325, dated Aug. 12, 2019.
Examination Report from Australian Patent Application No. 2017337325, dated Aug. 13, 2019.
Office Action from Russian Patent Application No. 2019112678/28, dated Sep. 20, 2019.
Communication from European Application No. 18707531.2, dated Oct. 7, 2019.
Examination Report No. 3 from Australian Application No. 2017337325, dated Mar. 19, 2020.
Office Action from Chinese Patent Application No. 201611159645.5, dated May 7, 2020.
Examination Report No. 2 from Australian Patent Application No. 2016389707, dated May 22, 2019.
Office Action from Canadian Patent Application No. 3,011,963, dated May 31, 2019.
Russian Search Report from Russian Patent Application No. 2018130672, dated Mar. 11, 2019.
Office Action from Japanese Patent Application No. 2018-538684, dated Sep. 3, 2019.
Office Action from European Patent Application No. 16888329.6, dated Sep. 4, 2019.
Office Action from Chinese Patent Application No. 201680000355.8, dated Sep. 18, 2019.
Examination Report No. 3 from Australian Patent Application No. 2016389707, dated Oct. 4, 2019.
Examination Report No. 4 from Australian Patent Application No. 2016389707, dated Jan. 10, 2020.
Office Action from Chinese Patent Application No. 201680000355.8, dated Mar. 12, 2020.
Examination Report No. 1 from Australian Patent Application No. 2018224018, dated Apr. 9, 2020.
Office Action from U.S. Appl. No. 15/081,497, dated Oct. 11, 2019.
Office Action from Chinese Patent Application No. 201710387443.4, dated Mar. 16, 2020.
Search Report from Russian Application No. 2019129543, dated Feb. 11, 2020, 4 pages.
Office Action from Chinese Patent Application No. 201710387443.4, dated Oct. 10, 2020.
Examination Report No. 2 from Australian Patent Application No. 2018224018, dated Sep. 18, 2020.
Office Action from Japanese Patent Application No. 2019-566568, dated Sep. 18, 2020, with English translation of "Outline of Office Action".
Examination Report from Indian Patent Application No. 201927007237, dated Nov. 19, 2020.
Office Action from Canadian Patent Application No. 3,053,768, dated Sep. 8, 2020.
Office Action from Chinese Patent Application No. 201710387443.4, dated Mar. 19, 2021.
Examination Report from Indian Patent Application No. 201927032782, dated Feb. 26, 2021.
Search Report from Russian Application No. 2019129543, dated Feb. 11, 2020, 4 pgs.
Office Action from U.S. Appl. No. 16/423,548, dated Jun. 11, 2021.
Office Action from Japanese Patent Application No. 2019-566568, dated Apr. 6, 2021.
Communmication Pursuant to 94(3) EPC from Euroepan Patent Application No. 17735348.9, dated Aug. 10, 2021.

* cited by examiner

PROCESS TRANSMITTER ISOLATION UNIT COMPENSATION

BACKGROUND OF THE INVENTION

Embodiments of the present disclosure relate to the measurement of parameters of a process, such as an industrial process, using a process sensor. More specifically, embodiments of the present disclosure relate to compensating process measurements performed by the process sensor for a time constant of an isolation unit through which the parameter is communicated to the process sensor.

Industrial processes are used in the manufacturing and transport of many types of materials. In such systems, it is often required to measure different parameters within the process. One such parameter is a pressure, such as a differential pressure, for example. The differential pressure is the pressure difference between one point in the process and another point in the process. Such differential pressure measurements may be useful in determining the flow rate of a process fluid in a pipe of the process, or to measure a height of a process fluid in a container, or to provide another process parameter measurement.

In industrial processes, process sensors, such as pressure sensors, are typically contained in, or coupled to, a process transmitter. The process transmitter is usually located at a remote location, and transmits the process measurement related information to a centralized location, such as a control room. The transmission is frequently over a process control loop. For example, a two-wire process control loop is often used in which two wires are used to carry both information, as well as power to the transmitter. Wireless process control loops may also be used.

Process transmitters, such as pressure transmitters, typically include an isolation unit that separates the process sensor from the process being measured. This protects the process sensor from process conditions that may damage the sensor, and/or adversely affect the measurement of the process parameter, for example.

Such isolation units introduce delays to the measurement of the process parameter due to the medium used, the structure of the isolation unit, and possibly other factors. Such a delay has a direct impact on the response time of the process parameter measurement by the process sensor. Furthermore, the delay varies depending on the operating conditions of the process transmitter. As a result, control system designers must design or tune the system for the worst-case response of the process transmitter. This may lead to an inefficient process, which can erode profitability of the process under control.

SUMMARY OF THE INVENTION

Embodiments of the present disclosure relate to process transmitters and methods for compensating process signals for time constants of an isolation unit through which process parameters are communicated. Some embodiments of the process transmitter include an isolation unit, a process sensor, a compensation circuit, and an output circuit. The isolation unit is configured to engage a process and includes a medium. The process sensor is configured to produce a process signal that is a function of a parameter of the process that is communicated through the medium. The compensation circuit is configured to compensate the process signal for a response time of the isolation unit, and output a compensated process signal. The output circuit is configured to produce a transmitter output as a function of the compensated process signal.

Some aspects of the method include a method for producing a process transmitter output. In some embodiments, a process signal is produced that is a function of a parameter of a process that is communicated through a medium of an isolation unit of the process transmitter using a process sensor. The process signal is compensated for a response time of the isolation unit and generating a compensated process signal using a compensation circuit. The process transmitter output is produced as a function of the compensated process signal using an output circuit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
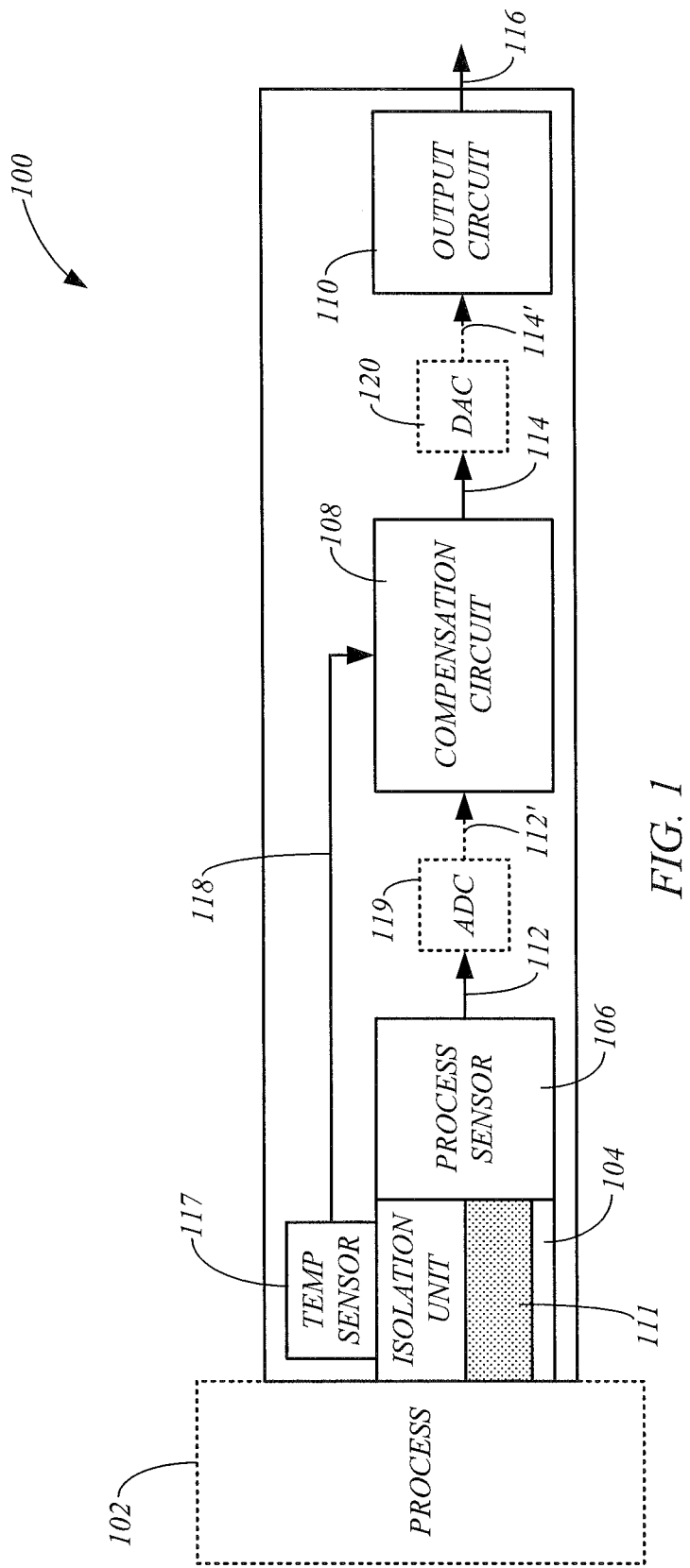
FIG. 1 is a simplified block diagram of a process transmitter, formed in accordance with one or more embodiments of the present disclosure, interacting with a process.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art relating to the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

Embodiments of the present disclosure are directed to compensating process transmitter parameter measurements to improve the response time of the process transmitter. This is generally accomplished by compensating a process signal produced by a process sensor that is a function of a parameter of the process being measured for a response time of an isolation unit that separates the process sensor from the process. The improved response time of the process transmitter can improve the efficiency of the process, and allows the process transmitter to be used in processes where high speed process parameter measurements are required.

FIG. 1 is a simplified block diagram of a process transmitter 100, which is formed in accordance with one or more embodiments of the present disclosure, interacting with a process 102. In some embodiments, the process 102 includes an industrial process that involves a material, such as a fluid, moving through pipes and tanks to transform less valuable materials into more valuable and useful products, such as petroleum, chemicals, paper, food, etc. For example, an oil refinery performs industrial processes that can process crude oil into gasoline, fuel oil, and other petrochemicals. Industrial process control systems use process devices, such as process transmitters, as measurement instruments for sensing and measuring process parameters, such as pressure, flow, temperature, level, and other parameters, in combination with, for example, control devices, such as valves, pumps and motors, to control the flow of materials during their processing.

In some embodiments, the process transmitter 100 includes an isolation unit 104, a process sensor 106, a compensation circuit 108, and an output circuit 110. The isolation unit 104 is configured to engage the process 102 and isolate the process sensor 106 from the process 102. The isolation unit 104 operates to communicate a parameter of the process 102 to the process sensor 106 for measurement through a suitable medium 111, such as a fluid, or other suitable medium. The process sensor 106 is configured to produce a process signal 112 that is a function of the measured parameter of the process 102 that is communicated through the medium 111 of the isolation unit 104.

The isolation unit 104 does not communicate the process parameter instantaneously to the process sensor 106. Rather, a delay in the communication and measurement of the process parameter is induced by the isolation unit 104. This delay relates to a response time of the isolation unit 104. In some embodiments, the response time of the isolation unit 104 is dependent on one or more variables, such as a temperature of the medium 111, a pressure, structures of the isolation unit 104 (e.g., diaphragms), materials forming the isolation unit, and/or other variables.

Effects of the delay in communicating and measuring the process variable using the sensor 106 include a limit on the measurement bandwidth of the process parameter being monitored. Specifically, the delay acts as a low-pass filter whose cutoff frequency drops in response to an increase in the delay or a decrease in the response time. As a result, changes in the process variable occurring above the cutoff frequency are rendered undetectable by the process sensor 106. Embodiments of the present disclosure operate to reduce or eliminate the delay by reducing the response time, thereby decreasing the cutoff frequency and the loss of potentially valuable information.

The compensation circuit 108 is configured to compensate the process signal 112 for the response time of the isolation unit 104, and output a compensated process signal 114, in which the delay corresponding to the response time is reduced. The output circuit 110 is configured to produce a transmitter output 116 as a function of the compensated process signal 114. In some embodiments, the compensation circuit 108 is configured to compensate the process signal 112 for the response time of the isolation unit 104 that is dependent on one or more variables, such as those mentioned above.

The compensation circuit 108 may comprise analog circuitry and/or digital circuitry. In some embodiments, the compensation circuit 108 represents one or more processors that are configured to execute instructions, which may be stored locally in memory of the compensation circuit 108, or in memory that is remote to the transmitter 100, to perform one or more functions described herein.

In some embodiments, the response time of the isolation unit 104 is dependent on a temperature of the medium 111 through which the process parameter is communicated to the process sensor 106. In some embodiments, the process transmitter 100 includes a temperature sensor 117 having a temperature signal 118 that is indicative of the temperature of the medium 111 of the isolation unit 104, and is used by the compensation circuit 108 to perform the compensation of the process signal 112 for the response time of the isolation unit 104.

In some embodiments, the response time of the isolation unit 104 is dependent on an operating pressure that the isolation unit 104 is subjected to during use. In some embodiments, the compensation circuit 108 uses the operating pressure to compensate the process signal 112 for the response time of the isolation unit 104. In some embodiments, the operating pressure is input to the compensation circuit 108 as a fixed variable, such as when the operating conditions of the isolation unit 104 are known. In some embodiments, a pressure sensor, such as a line pressure sensor, or a differential pressure sensor, may be used to determine the operating pressure of the isolation unit 104, and provide the compensation circuit 108 with a pressure signal that is indicative of the operating pressure. In some embodiments, the process sensor 106, or another sensor, operates as the pressure sensor that provides the compensation circuit 108 with the operating pressure of the isolation unit 104.

In some embodiments, the transmitter 100 is an analog device, in which the signals 112, 114, and 116 are analog signals. In some embodiments, the compensation circuit 108 includes a microprocessor that is configured to process the process signal 112 in the digital domain. In some embodiments, the process transmitter 100 includes an analog-to-digital converter (ADC) 119 that digitizes the analog process signal 112 into a digital process signal 112' for processing by the compensation circuit 108. In some embodiments, the compensated process signal 114 is in a digital signal, and the process transmitter 100 includes a digital-to-analog converter (DAC) 120 that converts the compensated process signal 114 to an analog compensated process signal 114' that is received by the output circuit 110.

In some embodiments, the output circuit 110 is configured to transmit the transmitter output 116 to a suitable controller that uses the transmitter output 116 to control aspects of the process 102. In some embodiments, the output circuit 110 transmits the transmitter output 116 to a controller that is remote from the process transmitter 100, such as in a remote control room.

Figure 2:
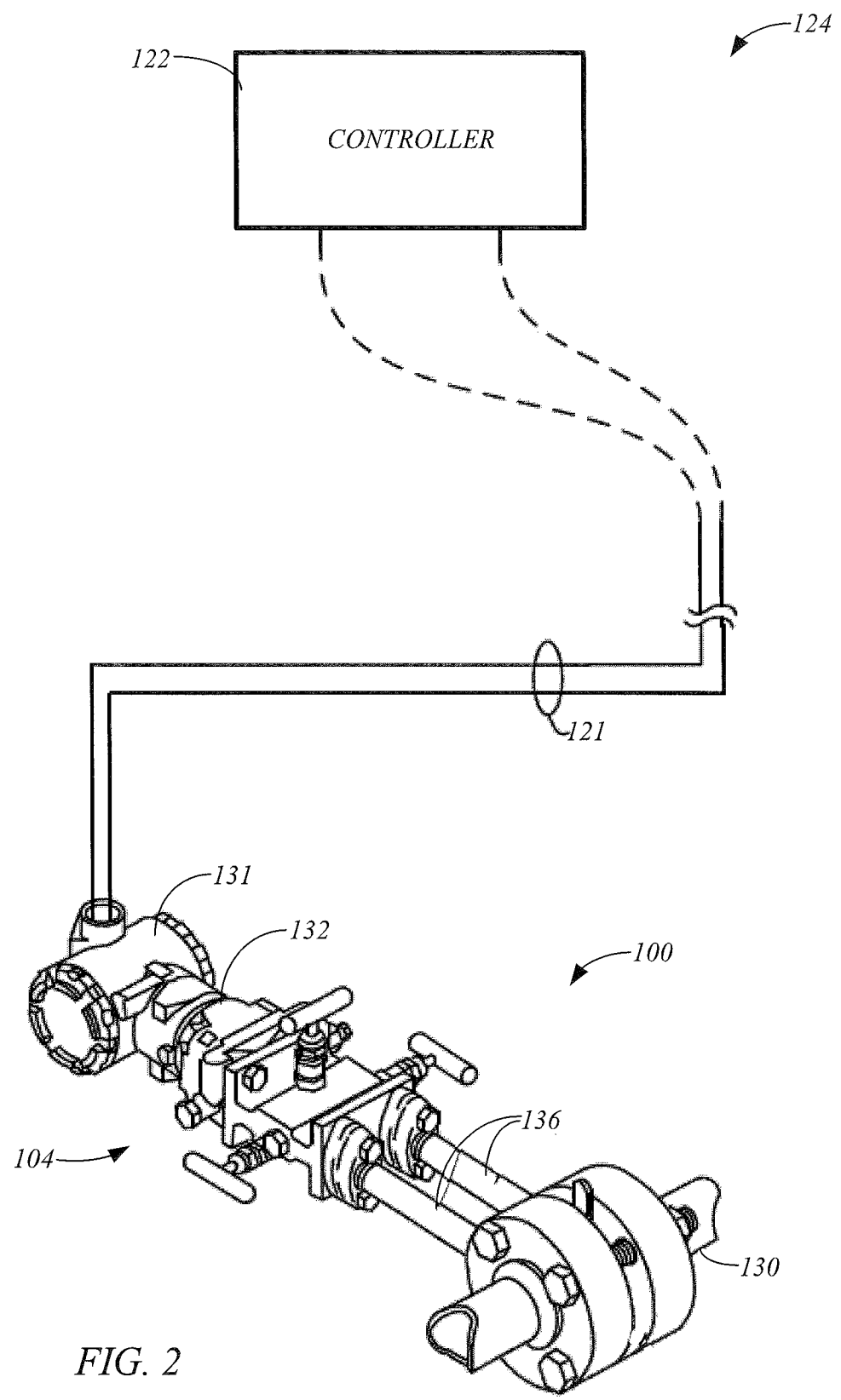
FIG. 2 is a simplified block diagram of process measurement system, in accordance with embodiments of the present disclosure.

In some embodiments, the output circuit 110 is connected to a controller 122 over a two-wire loop 121, as illustrated in the process measurement system 124 shown in FIG. 2. In some embodiments, the two-wire loop 121 is configured to transmit all power to the process transmitter 100. In some embodiments, the output circuit 110 communicates the transmitter output 116 over the two-wire loop to the controller 122 by modulating a current flow that varies between 4-20 milliamps. Alternatively, the output circuit 110 may be configured to transmit the transmitter output 116 to the controller 122 wirelessly in a point-to-point configuration, a mesh network, or other suitable configuration with the process transmitter 100 having its own power source.

Figure 3:
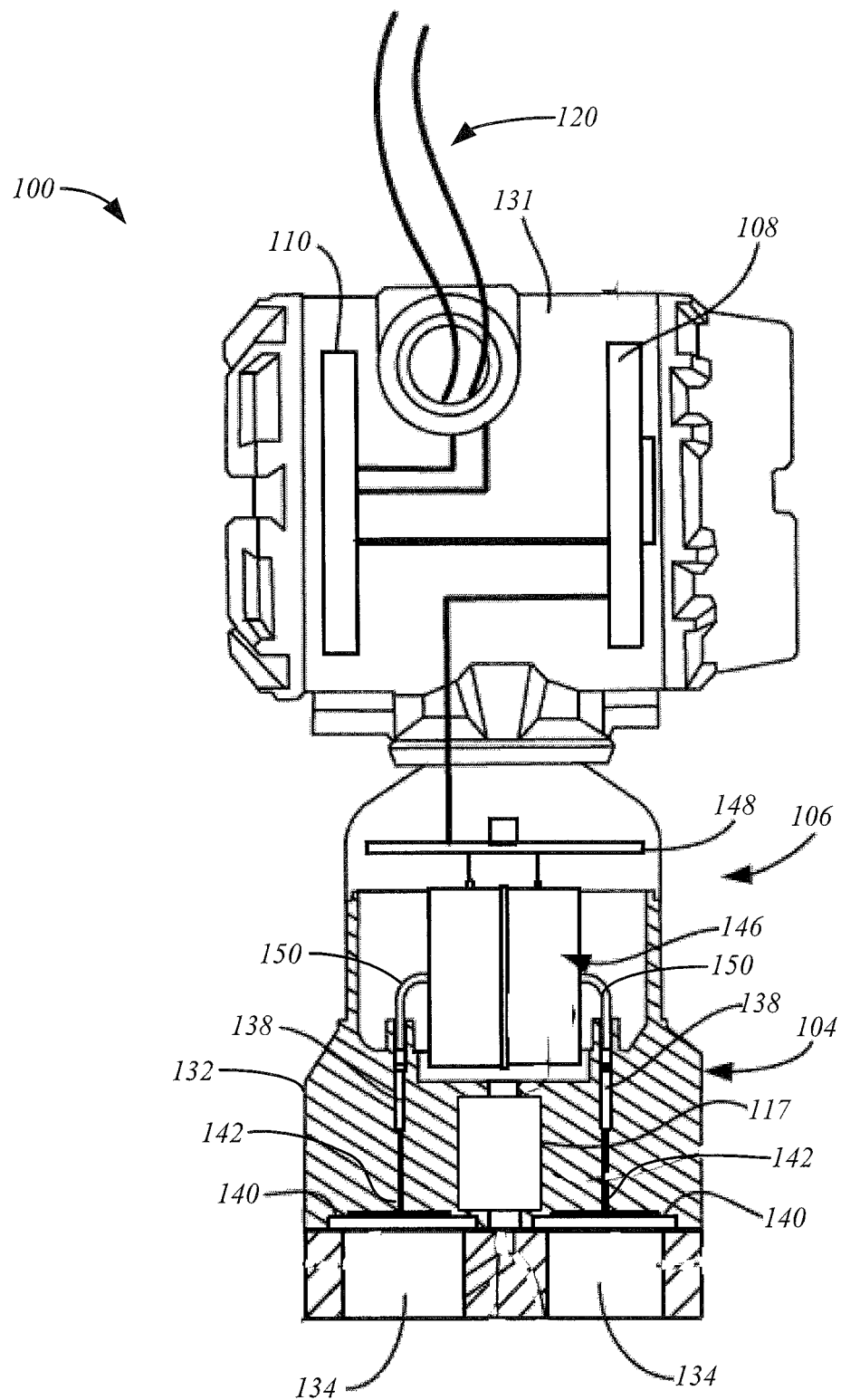
FIG. 3 is a simplified side view of the exemplary pressure transmitter with a cross-sectional view of an exemplary isolation unit, in accordance with embodiments of the present disclosure.

In some embodiments, the process transmitter 100 is in the form of a pressure transmitter, an exemplary embodiment of which is illustrated in FIGS. 2 and 3. FIG. 3 is a simplified side view of the exemplary pressure transmitter 100 with a cross-sectional view of an exemplary isolation unit 104, in accordance with embodiments of the present disclosure. In some embodiments, the process 102 being measured is in the form of a pressure of a fluid or other material that is contained within a pipe 130, to which the process transmitter 100 is attached, as shown in FIG. 2.

In some embodiments, the transmitter 100 includes a housing 131 that may contain, for example, the compensation circuit 108 and the output circuit 110, as shown in FIG. 3. In some embodiments, the isolation unit 104 includes a housing 132 that can be attached to the housing 131. In some embodiments, the housing 132 includes one or more ports 134 (FIG. 3) that are connected to the process 102 through a suitable connection, such as through impulse lines 136 (FIG. 2), for example. A pressure of the process 102 is received at each of the ports 134.

In some embodiments, the isolation unit 104 includes one or more fill tubes or isolation tubes 138 in the housing 132. In some embodiments, the housing 132 includes a flexible diaphragm 140 for each of the fill tubes 138 that seals an end 142 of the fill tube 138 and isolates the sense element 146 from the process 102. In some embodiments, each of the fill tubes 138 is filled with a fluid, such as a hydraulic fill fluid.

In the exemplary pressure transmitter 100, the process sensor 106 is a pressure sensor that includes a sense element 146 and electronics 148. The sense element 146 is positioned at an end 150 of the one or more fill tubes 138. Each diaphragm 140 deflects in response to a pressure of the process 102 received through the corresponding port 134, which applies the pressure to the fill fluid in the fill tube and communicates the pressure to the sense element 146. The sense element 146 senses the pressure and produces the process signal 112 as a function of the pressure using the electronics 148.

The sense element 146 may be any suitable sense element for detecting a line or differential pressure. The process or pressure signal 112 may be generated by the electronics based on changes in an electrical capacitance, changes in electrical resistance, changes in a resonant frequency, or using another suitable technique.

When the pressure transmitter 100 is in the form of a differential pressure transmitter, as shown in FIG. 3, the pressure sense element 146 is in the form of a differential pressure sense element, which may include a pair of pressure sense elements, and receives two pressures from the process 102 through the separate fill tubes 138, as shown in FIG. 3. The electronics 148 of the pressure sensor 106 generates the process signal 112 in response to a difference between the two pressures, in accordance with conventional techniques.

As discussed above, the process signal 112 is communicated to the compensation circuit 108, which compensates the process signal 112 for a response time of the isolation unit 104, and produces the compensated process signal 114. The following example applies to the pressure transmitter 100 utilizing the fluid medium 111 in the fill tubes 138 to communicate the process pressure to the process sensor 106.

It can be shown that for an ideal system, the effect of the fluid medium 111 in the tube 138 of the isolation unit 104 can be modelled as a first-order linear time-invariant system in the time domain as:

$$P_s(t) = P_{in}(t)\left(1 - e^{-\frac{t}{\tau}}\right) \qquad \text{Eq. 1)}$$

where $P_{in}(t)$ is the pressure of the process 102 (pressure input signal) and $P_s(t)$ is the pressure at the sensor 106. $\tau$ can be modelled as:

$$\tau = \frac{R}{s} \quad \text{Eq. 2)}$$

where R represents the sum of impedances to hydraulic flow in the isolation unit 104, such as in the tubes 138, and S represents the sum of the stiffnesses of the isolation diaphragm 140 and the sense element 146, shown in FIG. 3.

In the frequency domain Equation 1 becomes:

$$P_s(s) = P_{in}(s)\frac{1}{1+s\tau} \quad \text{Eq. 3)}$$

where s is the complex variable jω. The term $$\frac{1}{1+s\tau}$$

is thus the transfer function of the fluid medium 111 on the pressure input signal.

Accordingly, the original signal $P_{in}$ (s) can by recovered by applying the inverse of the hydraulic transfer function, 1+sτ, to $P_s$ (s):

$$P_{HC}(s) = P_s(s)(1+s\tau) = P_{in}(s)\frac{1}{1+s\tau}(1+s\tau) = P_{in}(s) \quad \text{Eq. 4)}$$

where $P_{HC}(s)$ represents the compensated pressure signal 114. This result indicates that with knowledge of the time constant of the fluid medium 111, τ, the first order effect of the hydraulics can be fully compensated.

Figure 4:
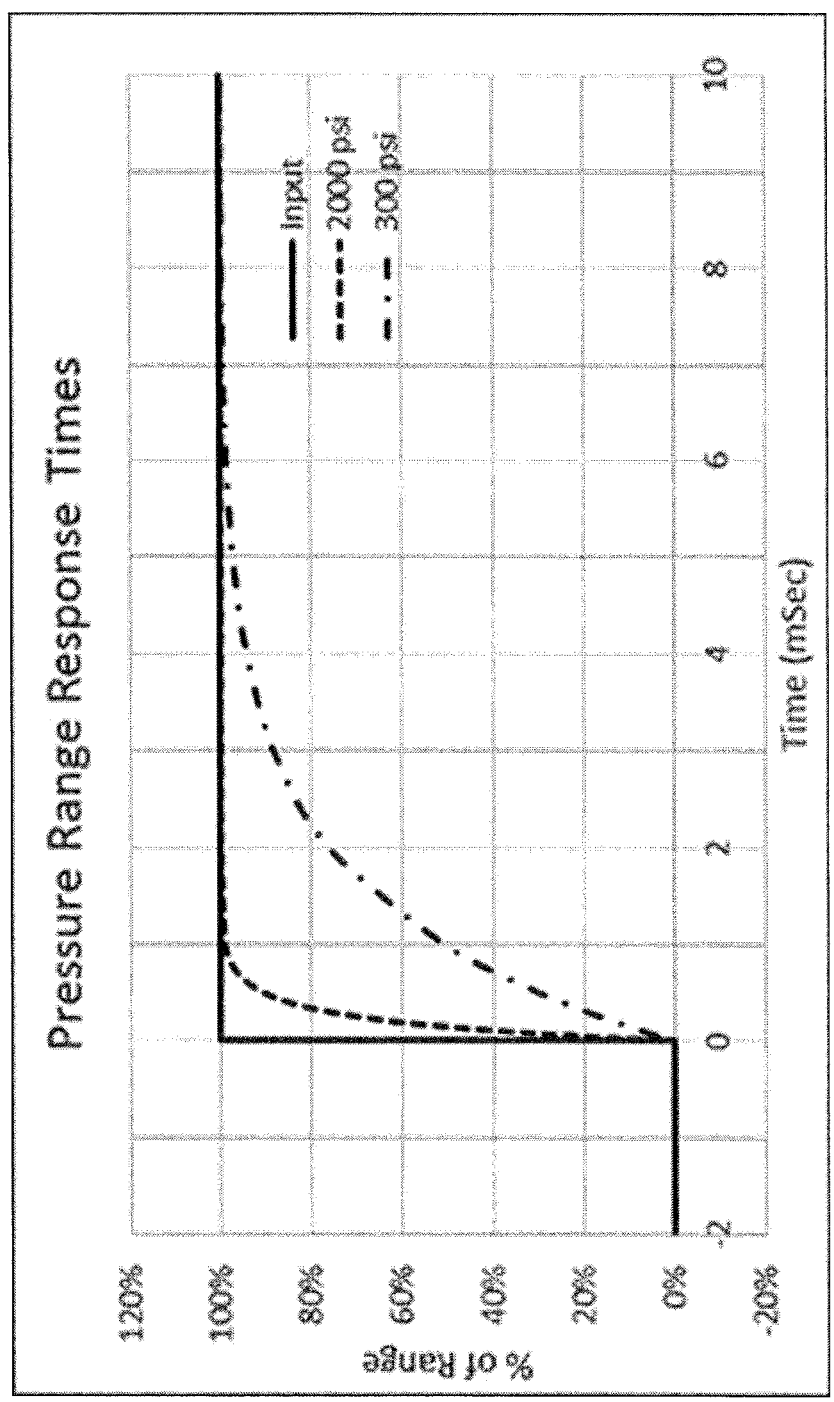
FIG. 4 is a chart that illustrates the effect of a stiffness change of an isolation unit on a step response of two different isolated pressure sensors.

As shown in Equation 2, there are two primary factors that influence the variable τ: S, the sum of the stiffnesses of the isolating diaphragm 140 and the sense element 146, and R, the sum of impedances to hydraulic flow. The stiffnesses of the diaphragm 140 and the sense element 146 are largely a function of the magnitude of the absolute value of the pressure to be measured and are fixed by design. Larger pressures utilize larger stiffness values for the diaphragm 140 and the sense element 146, and therefore exhibit smaller time constants. FIG. 4 is a chart that illustrates the effect of a stiffness change on the step response of two different isolated pressure sensors 106. Both sensors 106 assume an identical value for R.

Stiffnesses are characteristic of the design of the isolation unit 104 and the pressure sensor 106, and generally do not change significantly under varying environmental conditions. Therefore, in some embodiments, the compensation circuit 108 uses a constant value for S in Equation 2 for the system 124, which may be identified through design or testing.

The second factor, R, in Equation 3 is the sum of hydraulic impedances. This term, too, is largely a function of design: it is derived from factors such as fluid path cross-sectional areas, roughness of surfaces, etc. The different forms of hydraulic impedance take on the generic form $$R = \sum_{i=1}^{n} k_i v = v \sum_{i=1}^{n} k_i \quad \text{Eq. 5)}$$

where $k_i$ represents a constant associated with the $i^{th}$ impedance factor, n is the number of resistance terms and V represents the kinematic viscosity of the fluid medium 111. From Equation 5 we see that the sum of the hydraulic impedances is in fact linear with the kinematic viscosity of the fluid. Thus, while the $k_i$ terms are mostly constant over environmental conditions, the viscosity of the fluid medium 111 plays a significant role in determining R, as it can vary widely over temperature.

Figure 5:
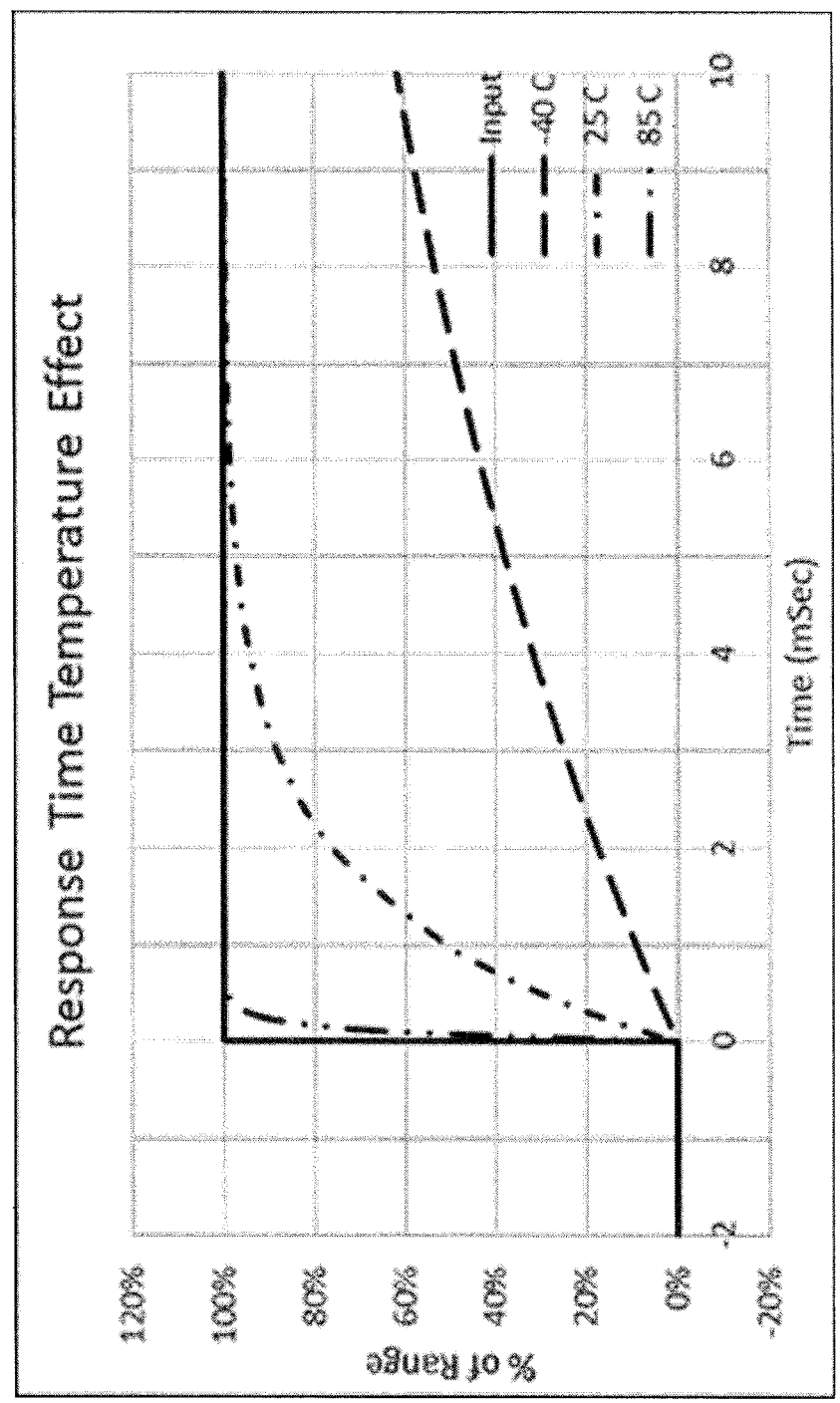
FIG. 5 is a chart that illustrates the role that temperature plays in affecting the step response of the pressure sensor used to generate the chart of FIG. 4.

FIG. 5 is a chart that illustrates the role that temperature plays in affecting the step response of the same pressure sensor 106 used to generate the response of the smaller pressure sensor in the chart of FIG. 4.

Figure 6:
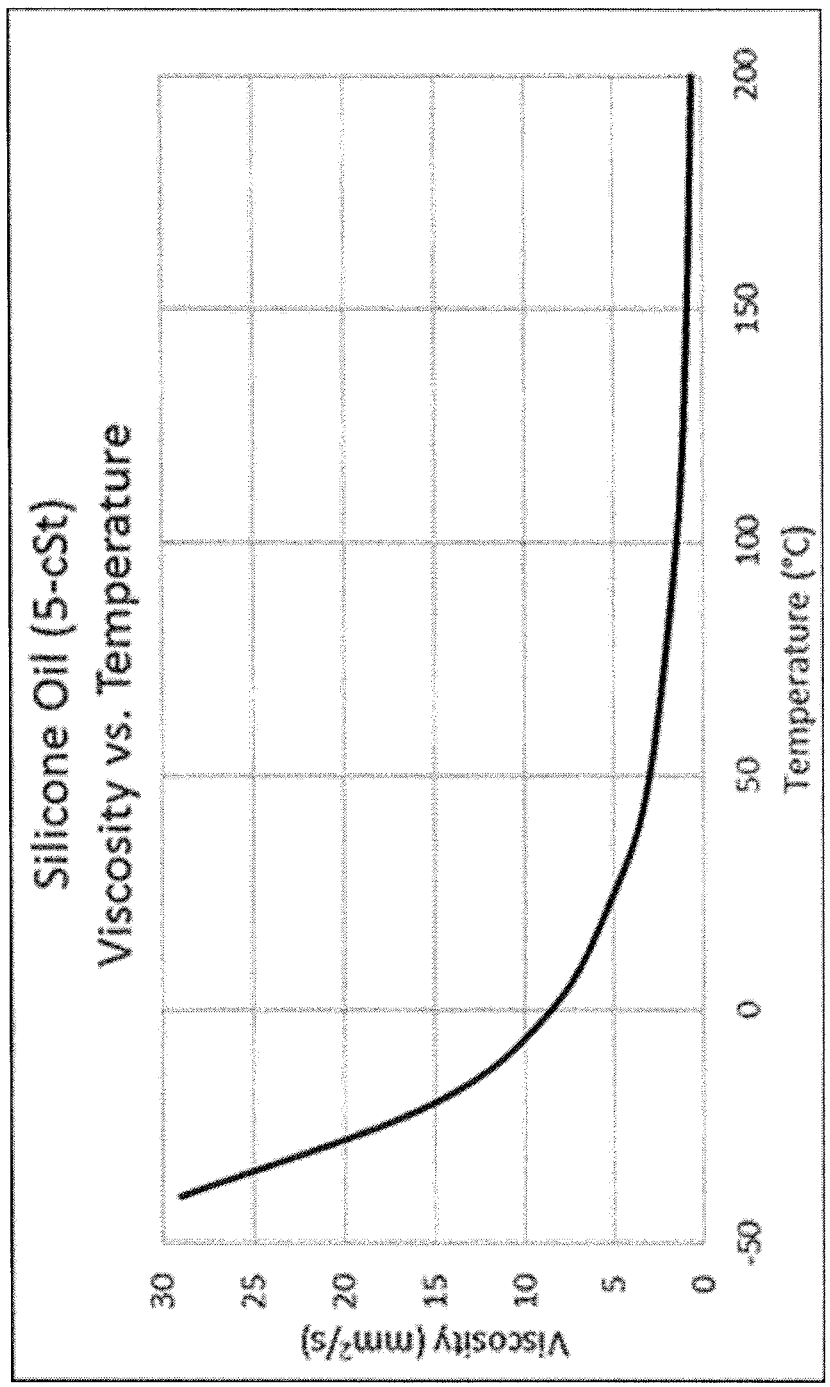
FIG. 6 is a chart that illustrates the change in viscosity of an exemplary fluid medium over temperature.

This behavior can be traced to the aforementioned sensitivity of viscosity to temperature. Viscosity for most fluids is highly non-linear with temperature exhibiting a logarithmic relationship. Fluid viscosities in a cold environment can be 5 to 20 times larger (or more) than at room temperature (fluid type dependent). FIG. 6 is a chart that illustrates the change in viscosity of an exemplary fluid medium 111 in the form of a 5 cSt oil over temperature. Accordingly, embodiments of the pressure transmitter 100 include the temperature sensor 117 that provides the temperature of the medium 111 to the compensation circuit 108, which uses the temperature of the medium 111 to accurately compensate for hydraulic effects of the medium 111 based on the temperature. The temperature signal 118 may also be used to compensate for other non-ideal sensor related temperature effects.

Assuming that the temperature effects are negligible (relative to the fluid viscosity) on the stiffnesses and $k_i$ components, Equation 2 can be re-written as:

$$\tau = \frac{v(T)\sum_{i=1}^{n} k_i}{s} = K \cdot v(T) \quad \text{Eq. 6)}$$

The hydraulic compensation transfer function, 1+sτ, from Equation 4 can then be re-written as:

$$TF_{HC}(s) = 1+s\tau = 1+sK \cdot v(T) \quad \text{Eq. 7)}$$

Figure 7:
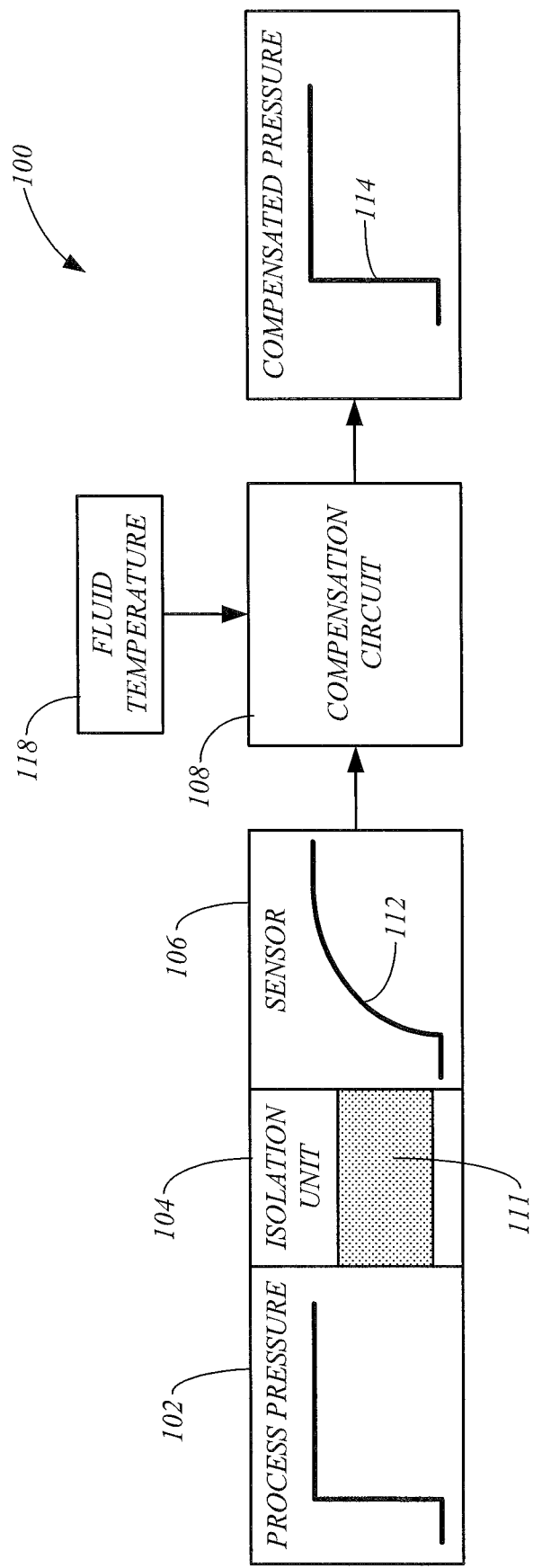
FIG. 7 is a simplified block diagram of a portion of a process transmitter in accordance with embodiments of the present disclosure.

Thus, as illustrated in the block diagram of FIG. 7, the communication of the process pressure parameter at the process 102 that is detected by the pressure sensor 106 (i.e., process signal 112) is affected by the time constant of the isolation unit 104, which is set by the temperature and viscosity of the fluid medium 111, and possibly the stiffnesses of the diaphragm 140 and the sense element 146, for example. The compensation circuit 108 operates to compensate the process signal 112 to generate the compensated process signal 114 that reduces the effects of the time constant of the isolation unit 104, such as the effects that are based on the temperature of the medium 111, by using the temperature signal 118.

Application of the transfer function in Equation 7 can be applied anywhere after the sensor pressure signal 112, $P_s(s)$, is obtained. When the process transmitter 100 operates in the analog domain, the compensation circuit 108 may include an appropriate analog high-pass filter to provide the desired compensation to the signal 112 and produce the compensated process signal 114. In some embodiments, a temperature of the fluid medium 111 is obtained using the temperature sensor 117, and is used to establish the viscosity v(T) of the fluid medium 111 before being fed to the analog filter in order to provide reasonable levels of compensation.

Preferably, the compensation circuit 108 operates in the digital domain and converts the pressure signal 112 from the sensor 106 using the ADC 119 to digital form before performing the necessary compensations to produce the compensated signal 114. Additionally, the temperature signal 118 and other compensating terms, are preferably converted to digital form for processing by the compensation circuit 108. An example of this method is provided below.

Once the isolation unit 104 and the sensor 106 subsystem is designed, its configuration is static. Thus, the stiffnesses, hydraulic pathways etc. that comprise the subsystem are not subject to any fundamental physical change. In this example, while there may be some physical effects due to pressure, these effects will be considered to be insignificant in relation to the effects of temperature on the viscosity of the fluid medium 111. Thus, the term K in Equation 7 becomes a parameter defined by the particular sensor subsystem design. The transfer function can then be defined as:

$$f_{HC}(T) = K \cdot v(T) = \tau \qquad \text{Eq. 8}$$

to represent the time constant, $\tau$, of Equation 7.

The compensation circuit 108 receives the temperature signal 118 that indicates the temperature of the fluid medium 111, and uses the temperature to determine $f_{HC}(T)$ by fitting the viscosity of the fluid medium 111 to the temperature, such as by performing a fit for the curve in FIG. 7, for example. This can be done via any standard curve fitting process (look-up table, polynomial fit, etc.). This fit can incorporate the constant K so that the fit result would actually be the desired $\tau$ for the hydraulic compensation transfer function. Depending on the accuracy needs, in some embodiments, a "family" curve fit could be employed for this function where the curve fit coefficients would be representative of a particular family of sensor subsystem. Where ultimate compensation accuracy is desired, a characterization of $\tau$ vs. T could be done for each individual sensor subsystem.

While the high-pass filter of Equation 7 compensates for the hydraulic damping, in some embodiments, this high-pass gain is limited to less than the Nyquist rate of the digital sampling performed by the ADC 119 to avoid aliasing high frequency noise into the measurement. This requires the application of a low pass filter with its cutoff frequency at less than half the sampling frequency of the ADC 119:

$$LPF = \frac{1}{1 + \frac{s}{\pi f_s}} \qquad \text{Eq. 9}$$

where $f_s$ is the sampling rate of the process signal 112 by the ADC 119. Combining this low-pass filter with the hydraulic compensation transfer function gives us our final applied compensation transfer function:

$$TF = \frac{1 + s\tau}{1 + s\frac{1}{g \cdot f_s}} ; g \leq \pi \qquad \text{Eq. 10}$$

We have substituted in the variable g in Equation 10 with the restriction that it be less than or equal to $\pi$ to satisfy the Nyquist criterion.

The transfer function of Equation 7 is then converted to a difference equation using well developed Z-transform methods suitable for implementation in the microprocessor of the compensation circuit 108. The result is the infinite impulse response filter:

$$P_{HC_n} = \frac{g}{g+2}(P_{s_n} + P_{s_{n-1}}) + \qquad \text{Eq. 11}$$

-continued
$$\frac{2f_s \cdot g \cdot K \cdot v(T)}{g+2}(P_{s_n} - P_{s_{n-1}}) - \frac{g-2}{g+2}P_{HC_{n-1}}$$

where $P_{HC_n}$ represents the nth sample of compensated process signal 114 and $P_{s_n}$ represents the nth sample of the process signal 112 at the sensor 106. In Equation 11, if one selects g=2 the last term is eliminated while meeting our Nyquist requirement; this action turns the filter into a guaranteed stable finite impulse response filter:

$$P_{HC_n} = \frac{1}{2}(P_n + P_{n-1}) + f_s \cdot \tau \cdot (P_n - P_{n-1}) \qquad \text{Eq. 12}$$

Some embodiments are directed to a method for producing a process transmitter output 116. In some embodiments of the method, a process signal 112 is produced by a process sensor 106 in response to a process parameter (e.g., a pressure, a temperature, a humidity, etc.) communicated through a medium 111 of an isolation unit 104. The process signal 112 is compensated for a response time of the isolation unit 104, and a compensated process signal 114 is generated using a compensation circuit 108. The process transmitter output 116 is produced as a function of the compensated process signal 114 using an output circuit 110. In some embodiments, the compensation circuit 108 compensates the process signal 112 for the response time of the isolation unit 104 using one or more of the equations described above, such as Equation 12.

In some embodiments of the method, a temperature signal 118 is produced as a function of a temperature of the medium 111 using a temperature sensor 117. The process signal 112 is compensated for the response time of the isolation unit 104 using the temperature signal 118.

In some embodiments of the method, the isolation unit 104 includes a housing 132, a fill tube 138, and a diaphragm sealing an end 142 of the fill tube 138, as shown in FIG. 3. In some embodiments, the medium 111 comprises a fluid in the fill tube 138. In some embodiments, the process sensor 106 includes a pressure sensor or sense element 146 at an end 150 of the fill tube. In some embodiments, the process signal 112 is produced as a function of a pressure communicated to the pressure sensor 106 or sense element 146 through the fluid medium 111 in the fill tube 138.

Figure 8:
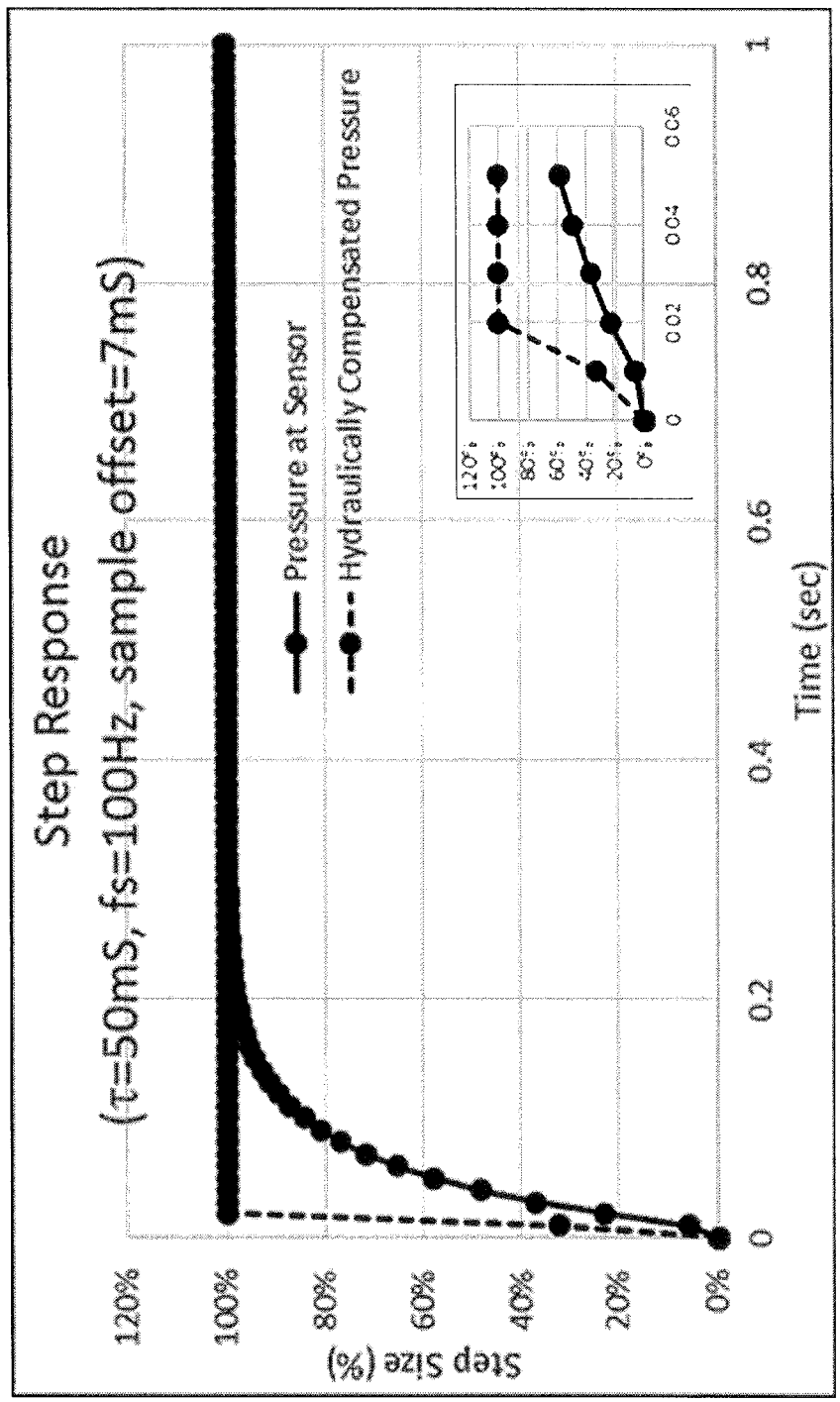
FIGS. 8 and 9 are charts illustrating exemplary processes and compensated signals, in accordance with embodiments of the present disclosure.

The following are exemplary compensations performed in accordance with embodiments of the present disclosure. In a first example, a step response of a pressure sensor 106 is hydraulically isolated from the process 102 by an isolation unit 104 having a time constant of 50 ms. Also, the process or pressure signal 112 produced by the sensor 106 is digitally sampled by the ADC 119 (FIG. 1) at 100 Hz. FIG. 8 is a chart illustrating the pressure at the sensor 106 (i.e., pressure indicated by the process signal 112) and the compensated pressure determined by the compensation circuit 108 (i.e., the pressure indicated by the compensated process signal 114) through the application of Equation 12 to the process signal 112.

FIG. 8 also includes an inset chart that illustrates the first few data points of the sampled process signal 112 and the compensated process signal 114. As shown, the first few data points of the compensated signal 114 may not precisely synchronize with the input pressure at the process 102 due to the sampling frequency. In this example, the delay is approximately 7 ms and is associated with a deadtime due to sampling rate. However, the second sample of the compensated process signal 114 is substantially synchronized with the input pressure at the process 102. By increasing the sampling frequency, it is possible to reduce the deadtime associated with sampling and further improve synchronization with the input pressure at the process 102.

Figure 9:
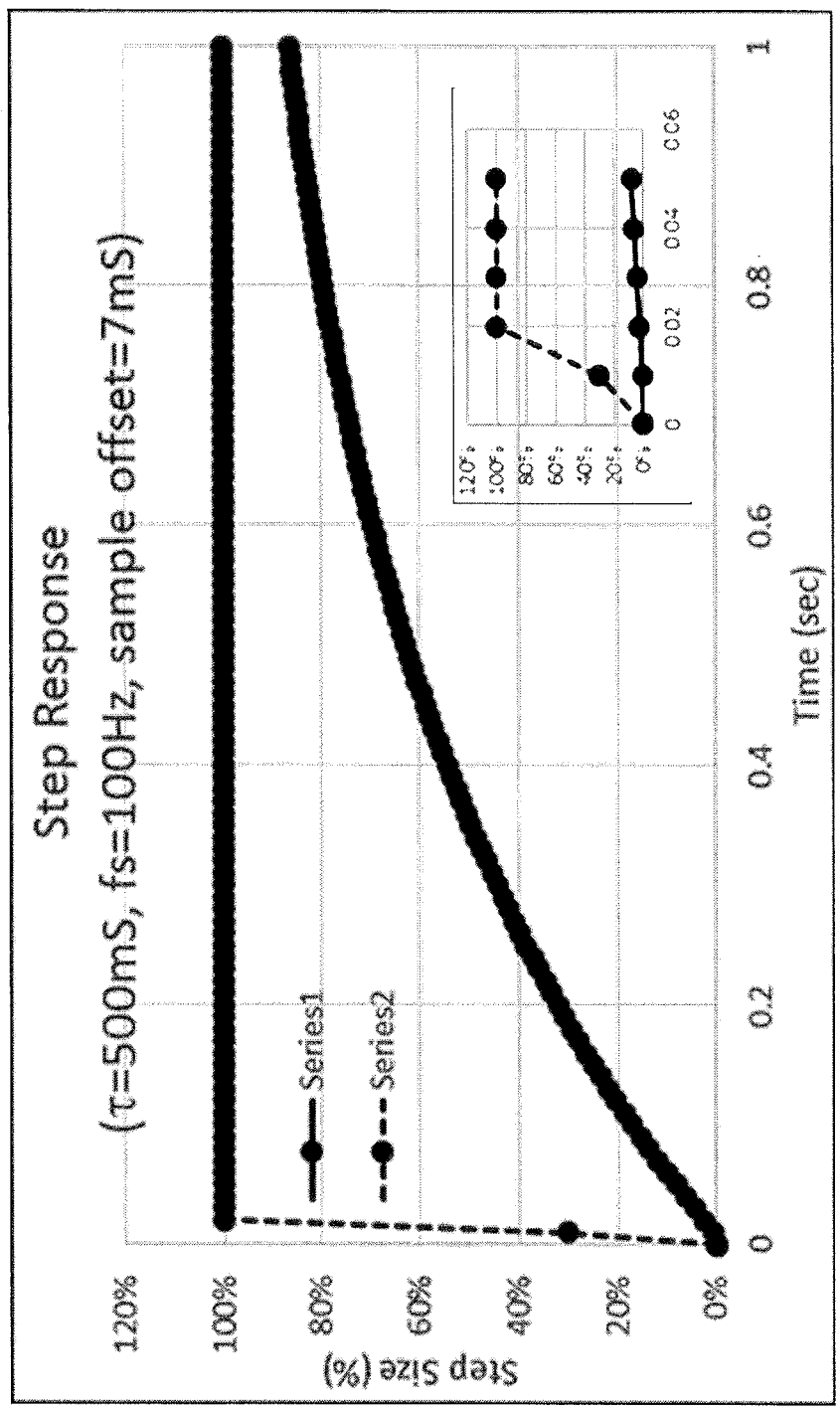

In a second example, the system of the first example is used, but the hydraulic time constant of the isolation unit 104 is increased by an order of magnitude due to a temperature change to 500 ms. The results of the compensation are illustrated in FIG. 9 with the inset chart illustrating the first few sampled data points of the compensated signal 114. A comparison between FIGS. 8 and 9 clearly illustrates that the compensated signal 114 substantially mirrors the input pressure at the process 102, and substantially compensates (e.g., within 1, 3 or 10 data points) for the hydraulic time constants of the isolation unit 104.

Although the present invention has been described with reference to preferred embodiments, workers skilled in the art will recognize that changes may be made in form and detail without departing from the spirit and scope of the invention. While specific examples of isolation unit time constant compensation that relate to the communication of a process parameter in the form of a pressure through a medium of the isolation unit, it is understood that embodiments of the present disclosure relate to isolation unit time constant compensation for other types of process parameters that are communicated to process measurement sensors through a medium of an isolation unit. Additionally, while exemplary embodiments of the process transmitter utilize a fluid medium of the isolation unit to communicate process parameters, it is understood that other types of mediums that are capable of communicating process parameters may also be used.

What is claimed is:

1. A process transmitter comprising:
an isolation unit configured to engage a process and including a medium;
a process sensor configured to produce a process signal that is a function of a parameter of the process that is communicated through the medium;
a temperature sensor configured to sense a temperature related to a temperature of the medium;
a compensation circuit configured to compensate the process signal for a response time of the isolation unit, and output a compensated process signal, wherein the compensation is based upon a hydraulic impedance of the medium as a function of the sensed temperature; and
an output circuit configured to receive the compensated process signal and produce a transmitter output as a function of the compensated process signal,
wherein:
the isolation unit comprises:
a housing;
a fill tube in the housing; and
a diaphragm sealing a first end of the fill tube;
the medium comprises a fluid in the fill tube; and
the process sensor comprises a pressure sensor at a second end of the fill tube.

2. The process transmitter according to claim 1, wherein the compensation circuit compensates the process signal for the response time of the isolation unit based on a pressure applied to the isolation unit by the process.

3. The process transmitter according to claim 1, wherein the parameter is a pressure.

4. The process transmitter according to claim 1, wherein:
the response time of the isolation unit is dependent on a viscosity of the fluid; and
the compensation circuit estimates the viscosity of the fluid based on the temperature output and compensates the process signal for the response time of the isolation unit based on the estimated viscosity.

5. The process transmitter according to claim 1, wherein:
the response time of the isolation unit is dependent on a stiffness of the diaphragm; and
the compensation circuit compensates the process signal for the response time of the isolation unit based on the stiffness of the diaphragm.

6. The process transmitter according to claim 5, wherein:
the response time of the isolation unit is dependent on a stiffness of a sense element of the process sensor; and
the compensation circuit compensates the process signal for the response time of the isolation unit based on the stiffness of the sense element.

7. The process transmitter according to claim 1, further comprising:
an analog-to-digital converter configured to convert the process signal produced by the process sensor to a digital process signal that is compensated by a processor of the compensation circuit to produce the compensated process signal in a digital form; and
a digital-to-analog converter configured to convert the compensated process signal to an analog compensated process signal;
wherein the output circuit is configured to produce the transmitter output as a function of the analog compensated process signal.

8. A process transmitter comprising:
an isolation unit comprising:
a housing;
a first fill tube in the housing having first and second ends;
a first diaphragm sealing the first end of the first fill tube and configured to engage a process; and
a fluid in the first fill tube;
a pressure sensor at the second end of the first fill tube configured to produce a process signal that is a function of a pressure that is communicated through the fluid in the first fill tube;
a temperature sensor configured to sense a temperature related to a temperature of the fluid;
an analog-to-digital converter configured to convert the process signal to a digital process signal;
a compensation circuit configured to compensate the digital process signal for a response time of the isolation unit, and output a digital compensated process signal, wherein the compensation is based upon a hydraulic impedance of the fluid as a function of the sensed temperature;
a digital-to-analog converter configured to convert the digital compensated process signal to an analog compensated process signal; and
an output circuit configured to receive the analog compensated process signal and produce a transmitter output as a function of the analog compensated process signal.

9. The process transmitter according to claim 8, wherein:
the response time of the isolation unit is dependent on a viscosity of the fluid; and
the compensation circuit estimates the viscosity of the fluid based on the temperature output and compensates the digital process signal for the response time of the isolation unit based on the estimated viscosity.

10. The process transmitter according to claim 8, wherein:
the response time of the isolation unit is dependent on a stiffness of the first diaphragm; and
the compensation circuit compensates the digital process signal for the response time of the isolation unit based on the stiffness of the diaphragm.

11. The process transmitter according to claim 10, wherein:
the response time of the isolation unit is dependent on a stiffness of a sense element of the process sensor; and
the compensation circuit compensates the digital process signal for the response time of the isolation unit based on the stiffness of the sense element.

12. The process transmitter according to claim 8, wherein:
the isolation unit includes:
a second fill tube in the housing having first and second ends;
a second diaphragm sealing the first end of the second fill tube and configured to engage the process; and
a fluid in the second fill tube; and
the pressure sensor is configured to produce the process signal for the response time of the isolation unit as a function of a difference between the pressure communicated through the fluid in the first fill tube and a pressure communicated through the fluid in the second fill tube.

13. The process transmitter according to claim 12, wherein:
the process transmitter further comprises a temperature sensor configured to produce a temperature signal as a function of the temperature of the fluid in at least one of the first and second fill tubes; and
the compensation circuit compensates the digital process signal for the response time of the isolation unit based on the temperature signal.

14. A method for producing a process transmitter output comprising:
producing a process signal that is a function of a parameter of a process that is communicated through a medium of an isolation unit of the process transmitter using a process sensor;
measuring a temperature related to a temperature of the medium;
compensating the process signal for a response time of the isolation unit and generating a compensated process signal using a compensation circuit, wherein the compensation is based upon a hydraulic impedance of the medium as a function of the sensed temperature; and
producing the process transmitter output as a function of the compensated process signal using an output circuit, wherein:
the isolation unit comprises:
a housing;
a fill tube in the housing; and
a diaphragm sealing a first end of the fill tube;
the medium comprises a fluid in the fill tube;
the process sensor comprises a pressure sensor at a second end of the fill tube; and
producing a process signal comprises producing the process signal as a function of a pressure communicated to the pressure sensor through the fluid in the fill tube.

\* \* \* \* \*